(12) United States Patent
Kleemann et al.

(10) Patent No.: US 10,940,859 B2
(45) Date of Patent: Mar. 9, 2021

(54) AUTOMATIC SPEED CONTROL AND METHOD FOR THE AUTONOMOUS SPEED CONTROL OF A VEHICLE

(71) Applicant: Robert Bosch GmbH, Stuttgart (DE)

(72) Inventors: Ralf Kleemann, Benningen am Neckar (DE); Thomas Friedrich, Ingersheim (DE)

(73) Assignee: Robert Bosch GmbH, Stuttgart (DE)

( * ) Notice: Subject to any disclaimer, the term of this patent is extended or adjusted under 35 U.S.C. 154(b) by 74 days.

(21) Appl. No.: 16/381,261

(22) Filed: Apr. 11, 2019

(65) Prior Publication Data
US 2019/0315354 A1  Oct. 17, 2019

(30) Foreign Application Priority Data

Apr. 12, 2018 (DE) .......................... 102018205525.4

(51) Int. Cl.
| | |
|---|---|
| *B60W 30/14* | (2006.01) |
| *F16D 65/84* | (2006.01) |
| *F16D 66/02* | (2006.01) |
| *F16H 59/14* | (2006.01) |
| *B60C 23/00* | (2006.01) |
| *B60K 31/02* | (2006.01) |
| *G05D 1/00* | (2006.01) |

(52) U.S. Cl.
CPC .......... *B60W 30/143* (2013.01); *B60K 31/02* (2013.01); *G05D 1/0088* (2013.01)

(58) Field of Classification Search
CPC ........ B60W 30/14; F16D 65/84; F16D 66/02; B60C 23/00; F16H 59/14
See application file for complete search history.

(56) References Cited

U.S. PATENT DOCUMENTS

| | | | | |
|---|---|---|---|---|
| 5,319,555 | A | * | 6/1994 | Iwaki .................... F16H 59/14 |
| | | | | 477/120 |
| 2009/0159375 | A1 | * | 6/2009 | Vitali .................... B60T 13/662 |
| | | | | 188/1.11 W |
| 2010/0217471 | A1 | * | 8/2010 | Stenman ............... B60C 23/062 |
| | | | | 701/31.4 |

FOREIGN PATENT DOCUMENTS

JP          05215160 A  *  8/1993  ............. F16D 65/84

* cited by examiner

*Primary Examiner* — Yuri Kan
(74) *Attorney, Agent, or Firm* — Norton Rose Fulbright US LLP; Gerard Messina

(57) ABSTRACT

An automatic speed control including repeated autonomous establishment of a setpoint variable regarding a setpoint speed and/or a setpoint acceleration of the vehicle in such a way that the setpoint speed is smaller or equal to a specified or established maximum speed and/or the setpoint acceleration of the vehicle remains smaller or equal to a specified or established maximum acceleration controlling at least one vehicle component by taking into account the autonomously newly established setpoint variable so that an actual speed of the vehicle corresponds to the setpoint speed and/or an actual acceleration of the vehicle corresponds to the setpoint acceleration; and establishing the maximum speed and/or the maximum acceleration by taking into account a measured and/or estimated temperature of a component of a wheel brake caliper and/or a driving variable that is relevant for overheating of the component of the wheel brake caliper.

10 Claims, 2 Drawing Sheets

AUTOMATIC SPEED CONTROL AND METHOD FOR THE AUTONOMOUS SPEED CONTROL OF A VEHICLE

CROSS REFERENCE

The present application claims the benefit under 35 U.S.C. § 119 of German Patent Application No. DE 102018205525.4 filed on Apr. 12, 2018, which is expressly incorporated herein by reference in its entirety.

FIELD

The present invention relates to an automatic speed control for a vehicle. The present invention also relates to a method for the autonomous speed control of a vehicle.

BACKGROUND INFORMATION

Conventionally, a speed of a vehicle, or a (positive or negative) acceleration of the vehicle, can be controlled automatically while the vehicle is driving autonomously or partly autonomously.

SUMMARY

The present invention provides an automatic speed control for a vehicle and a method for autonomously controlling the speed of a vehicle.

The present invention provides options for reliably countering an unwanted loss of braking force of at least one wheel brake caliper of a vehicle due to an increased temperature of at least one component of the at least one wheel brake caliper. This unwanted loss of braking force of the at least one wheel brake caliper of the respective vehicle is often also called fading. Using the present invention it is thus possible to prevent an unwanted high temperature of the at least one component of the at least one wheel brake caliper of the respective vehicle from resulting in a loss of friction, which limits the braking force that the at least one wheel brake caliper is able to produce.

Since the present invention makes it possible to reliably counter unwanted fading, it is readily possible to dispense with conventional remedial measures for reducing fading in the respectively utilized brake system (having the at least one wheel brake caliper of the respective vehicle). In particular, when using the present invention, the usual necessity of having to overdimension the brake system is eliminated. The elimination of the normally still necessary overdimensioning of the brake system makes it possible to save costs. Furthermore, the elimination of the necessity of a massive design of the overall brake system makes it possible to reduce the weight of the latter. The present invention thus also contributes toward reducing an energy consumption of the vehicle equipped with a lighter brake system, and possibly toward reducing an emission of pollutants while driving.

In an advantageous specific embodiment of the automatic speed control, the electronics system is designed to estimate, on the basis of at least one temperature model, at least one temperature of at least one brake disk and/or of at least one brake drum as the at least one component, and to establish the maximum speed and/or the maximum acceleration by taking into account at least the at least one estimated temperature. It is thus readily possible to dispense with equipping the at least one wheel brake caliper with at least one sensor for measuring the at least one temperature of the at least one brake disk and/or of the at least one brake drum.

As an alternative or as a supplement to the previously described specific embodiment, the electronics system may however also be designed to establish the maximum speed and/or the maximum acceleration by taking into account at least one measured temperature, provided to the electronics system, of the at least one brake disk and/or of the at least one brake drum as the at least one component. It is advantageous to take into account (additionally) the at least one measured temperature of the at least one brake disk and/or of the at least one bake drum when establishing the maximum speed and/or maximum acceleration since an increased temperature of the at least one brake disk and/or of the at least one brake drum may result in an unwanted loss of the braking force of the at least one wheel brake caliper, i.e., in an unwanted fading.

In another advantageous specific embodiment of the automatic speed control, the electronics system is designed to establish, as the at least one driving variable relevant for overheating, the maximum speed and/or the maximum acceleration by taking into account a current speed value of the actual speed, an ascertained average speed value of the actual speed over a distance already traveled in the autonomous or partly autonomous drive, an ascertained frequency of the actual speed exceeding a specified speed threshold value over the already traveled distance, a current acceleration value of the actual acceleration, an ascertained average acceleration value of the actual acceleration over the already traveled distance, an ascertained frequency of the actual acceleration exceeding a specified acceleration threshold value over the already traveled distance, a counted total number of braking actions over the already traveled distance, an ascertained average braking duration value of braking actions over the already traveled distance, an ascertained average interval value between successive braking actions over the already traveled distance, an ascertained average deceleration value of braking actions over the already traveled distance, an ascertained frequency of exceeding a specified deceleration threshold value in braking actions over the already traveled distance, an ascertained drop of the roadway elevation of a roadway currently traveled by the vehicle, an ascertained average value of a roadway elevation drop over the already traveled distance and/or an ascertained frequency of exceeding a specified roadway elevation drop threshold value over the already traveled distance. The present invention thus provides options for detecting (indirectly) whether there exists an increased risk of fading.

Additionally, the electronics system may also be designed to establish, as the at least one driving variable relevant for overheating, the maximum speed and/or the maximum acceleration by taking into account at least one predicted average speed value of the actual speed over a distance to be traveled in the autonomous or partly autonomous drive, a predicted frequency of the actual speed exceeding the specified speed threshold value over the distance to be traveled, a predicted average acceleration value of the actual acceleration over the distance to be traveled, a predicted frequency of the actual acceleration exceeding the specified acceleration threshold value over the distance to be traveled, a predicted total number of braking actions over the distance to be traveled, a predicted average braking duration value of braking actions over the distance to be traveled, a predicted average interval value between successive braking actions over the distance to be traveled, a predicted average deceleration value of braking actions over the distance to be traveled, a predicted frequency of exceeding the specified deceleration threshold value in braking actions over the distance to be traveled, a predicted average value of a roadway elevation drop over the distance to be traveled and/or a predicted frequency of exceeding the specified roadway elevation drop threshold value over the distance to be traveled. The fact that today a multitude of vehicles are already equipped with a position-determining system and/or a navigation information system may thus also be used by the automatic speed control to estimate the risk of fading for the distance yet to be traveled and to establish the maximum speed and/or the maximum acceleration in such a way that an unwanted fading is counteracted early.

An implementation of a corresponding method for autonomous speed control of a vehicle in accordance with the present invention also yields the previously described advantages. It is pointed out explicitly that the method in accordance with the specific embodiments of the automatic speed control explained above is capable of being developed further autonomously.

BRIEF DESCRIPTION OF THE DRAWINGS

Additional features and advantages of the present invention are explained below with reference to the figures.

DETAILED DESCRIPTION OF EXAMPLE EMBODIMENTS

Figure 1:
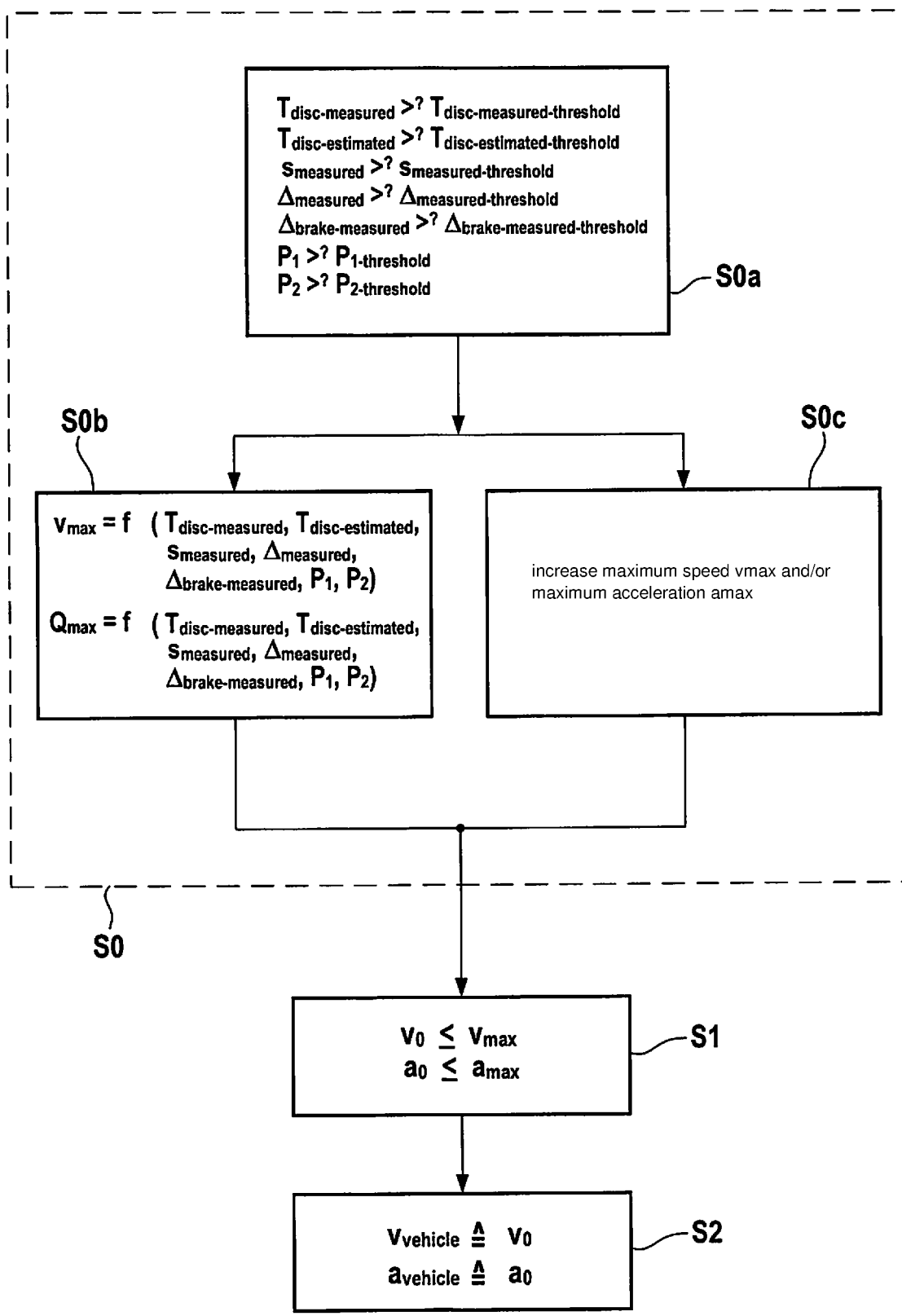
FIG. 1 shows a flow chart for explaining a specific embodiment of the method for the autonomous speed control of a vehicle.

FIG. 1 shows a flow chart for explaining a specific embodiment of the method for the autonomous speed control of a vehicle.

The method described below for the autonomous speed control may be implemented in a plurality of different vehicle types/motor vehicle types. It is pointed out explicitly that an implementation of the method for autonomous speed control is not limited to any specific vehicle type/motor vehicle type of a vehicle/motor vehicle used for its implementation.

The method described below for the autonomous speed control is implemented while the vehicle is driving autonomously or partly autonomously. Using the method it is possible to effect an autonomous speed control of the traveling vehicle in such a way that a driver of the vehicle has to make no work effort at all for controlling the speed of his vehicle. The autonomous or partly autonomous drive of the vehicle is thus to be understood as a drive during which the automatic speed control frees the driver from any conventional work effort for controlling the speed of his vehicle.

The method has a method step S1, which is performed repeatedly during the autonomous or partly autonomous drive of the vehicle. In method step S1, at least one setpoint variable regarding a setpoint speed $v_0$ of the vehicle and/or a setpoint acceleration $a_0$ of the vehicle is autonomously established in such a way that the setpoint speed $v_0$ of the vehicle remains smaller than or equal to a specified or established maximum speed $v_{max}$ and/or the setpoint acceleration $a_0$ of the vehicle remains smaller than or equal to a specified or established maximum acceleration $a_{max}$. The autonomous establishment of the at least one setpoint variable occurs preferably by taking into account at least one item of traffic and/or driving environment information ascertained by at least one sensor. In the autonomous establishment of the at least one setpoint variable it is likewise possible also to take into account data of a position-determining system, such as e.g. a global positioning system, and/or of a navigation information system. The autonomous establishment of the at least one setpoint variable, however, occurs without a work effort on the part of the driver.

The at least one setpoint variable may be for example the setpoint speed $v_0$ and/or the setpoint acceleration $a_0$ of the vehicle. Likewise, the at least one setpoint variable may be understood as a control variable for controlling at least one vehicle component of the vehicle, by which the vehicle is able to accelerate and/or able to decelerate. Since procedures for establishing the at least one setpoint variable are thus known from the related art, they will not be discussed in greater detail here.

In a method step S2 following each performance of method step S1, the at least one vehicle component of the vehicle, by which the vehicle is able to accelerate and/or able to decelerate, is controlled by taking into account the at least one autonomously newly established setpoint variable in such a way that an actual speed $v_{vehicle}$ of the vehicle corresponds to the setpoint speed $v_0$ and/or an actual acceleration $a_{vehicle}$ of the vehicle corresponds to the setpoint acceleration $a_0$. The at least one setpoint variable established in method step S1 is thus implemented in method step S2.

The method described here also comprises a method step S0, which is performed at least once during the autonomous or partly autonomous drive of the vehicle. The at least one performance of method step S0 may occur prior to and/or during the repeated performance of method steps S1 and S2.

In method step S0, the maximum speed $V_{max}$ and/or the maximum acceleration $a_{max}$ are established. The maximum speed $v_{max}$ and/or the maximum acceleration $a_{max}$ are established by taking into account at least one measured and/or estimated temperature $T_{disc-measured}$, $T_{disc-estimated}$, $T_{drum-measured}$ and $T_{drum-estimated}$ of at least one component of at least one wheel brake caliper of the vehicle and/or at least one driving variable $n_{counted}$, $\Delta_{measured}$, $\Delta_{brake-measured}$ and $s_{measured}$ that is relevant for overheating of the at least one component of the at least one wheel brake caliper of the vehicle. On the basis of the at least one measured and/or estimated temperature $T_{disc-measured}$, $T_{disc-estimated}$, $T_{drum-measured}$ and $T_{drum-estimated}$ and/or on the basis of the at least one driving variable relevant to overheating $n_{counted}$, $\Delta_{measured}$, $\Delta_{brake-measured}$ and $s_{measured}$, an investigation is performed to determine whether there is a risk of an unwanted loss of the braking force of the at least one wheel brake caliper due to a temperature increase on its at least one component. The unwanted loss of braking force of the at least one wheel brake caliper due to temperature increases is often called fading. If on the basis of the at least one measured and/or estimated temperature $T_{disc-measured}$, $T_{disc-estimated}$, $T_{drum-measured}$ and $T_{drum-estimated}$ and/or on the basis of the at least one driving variable relevant to overheating $n_{counted}$, $\Delta_{measured}$, $\Delta_{brake-measured}$ and $s_{measured}$, an increased overheating risk for the at least one wheel brake caliper, i.e. an existence of an increased risk of fading/fading criticality is determined/detected, then a driving strategy implemented by the additional method steps S1 and S2 is adapted (automatically) by reducing the maximum speed $v_{max}$ and/or the maximum acceleration $a_{max}$ in such a way that the unwanted fading is counteracted early.

By way of the adaptation, triggered by method step S0, of the driving strategy implemented in the further method steps S1 and S2 to the ascertained/detected existence of an increased risk of fading, an intense braking of the vehicle during its continued travel is automatically avoided/limited (by reducing the maximum speed $v_{max}$ and/or the maximum acceleration $a_{max}$). A strong heating up of the at least one wheel brake caliper due to frequent intense braking of the vehicle during its continued travel is thus likewise avoided. The fading is thus prevented or is at least attenuated in its effects. This advantage is ensured even when the conventionally necessary overdimensioning of the brake system used for braking the vehicle is dispensed with. The conventionally necessary overdimensioning of the brake system may thus be omitted when implementing the method for autonomous speed control described here. The method described here thus results not only in increased safety, but may also contribute toward reducing manufacturing costs and/or a weight of brake systems.

In the specific embodiment described here, method step S0 comprises a first sub-step S0a, in which on the basis of the at least one measured and/or estimated temperature $T_{disc-measured}$, $T_{disc-estimated}$, $T_{drum-measured}$ and $T_{drum-estimated}$ and/or on the basis of the at least one driving variable relevant to overheating $n_{counted}$, $\Delta_{measured}$, $\Delta_{brake-measured}$ and $s_{measured}$, an investigation is performed to determine whether there is a risk of fading. If the existence of an increased risk of fading is ascertained in sub-step S0a, then a further sub-step S0b is performed, in which the maximum speed $v_{max}$ and/or the maximum acceleration $a_{max}$ are reduced. The maximum speed $v_{max}$ and/or the maximum acceleration $a_{max}$ may be reduced in a stepwise manner, for example. In particular, it is possible continuously to reduce the maximum speed $v_{max}$ and/or the maximum acceleration $a_{max}$ by repeated performance of method step S0 until a "recovery" from the increased risk of fading is ascertained in sub-step S0a. Likewise, as is shown in the example of FIG. 1, it is also possible to establish the maximum speed $v_{max}$ and/or the maximum acceleration $a_{max}$ anew in sub-step S0b as a function of the at least one measured and/or estimated temperature $T_{disc-measured}$, $T_{disc-estimated}$, $T_{drum-measured}$ and $T_{drum-estimated}$ and/or of the at least one driving variable relevant to overheating $n_{counted}$, $\Delta_{measured}$, $\Delta_{brake-measured}$ and $s_{measured}$. By way of all of the procedures listed here for establishing the maximum speed $v_{max}$ and/or the maximum acceleration $a_{max}$, it is possible to ensure that a thermal energy input into the brake system, in particular into its at least one wheel brake caliper, is limited in a potential subsequent braking action and that the brake system thus has sufficient time to cool off.

If however the existence of an increased risk of fading is denied in sub-step S0a, then there is no reduction in the maximum speed $v_{max}$ and/or the maximum acceleration $a_{max}$. If the existence of an increased risk of fading is denied in method step S0, the maximum speed $v_{max}$ and/or the maximum acceleration $a_{max}$ preferably remain unchanged. In this case, it is optionally also possible to perform a method step $S0_c$, in which the maximum speed $v_{max}$ and/or the maximum acceleration $a_{max}$ are increased, for example because in method step S0a following a so-called "cooling off phase" at a reduced maximum speed $v_{max}$ and/or a reduced maximum acceleration $a_{max}$ a "recovery" of the at least one wheel brake caliper of the vehicle is ascertained. Following the "cooling off phase" (e.g. with a firmly specified cooling off time interval), either as a function of the at least one measured and/or estimated temperature $T_{disc-measured}$, $T_{disc-estimated}$, $T_{drum-measured}$ and $T_{drum-estimated}$ and/or of the at least one driving variable relevant to overheating $n_{counted}$, $\Delta_{measured}$, $\Delta_{brake-measured}$ and $s_{measured}$, the maximum speed $v_{max}$ and/or the maximum acceleration $a_{max}$ may be established anew or may be increased in stepwise fashion until a specified initial value/normal value of the maximum speed $v_{max}$ and/or a specified initial value/normal value of the maximum acceleration $a_{max}$ are reached.

In the method of FIG. 1, the maximum speed $v_{max}$ and/or the maximum acceleration $a_{max}$ are established by taking into account at least one measured temperature $T_{disc-measured}$ of at least one brake disk and/or at least one measured temperature $T_{drum-measured}$ of at least one brake drum (as the at least one component). The at least one measured temperature $T_{disc-measured}$ and $T_{drum-measured}$ of the at least one brake disk and/or of the at least one brake drum may be reliably determined using at least one temperature sensor of the respective wheel brake caliper. The existence of an increased risk of fading may be detected for example if the at least one measured temperature $T_{disc-measured}$ and $T_{drum-measured}$ exceeds at least one specified measured temperature threshold value $T_{disc-measured-threshold}$ and $T_{drum-measured-threshold}$.

Likewise, on the basis of at least one temperature model/brake temperature model, it is possible to estimate at least one temperature $T_{disc-estimated}$ of the at least one brake disk and/or at least one temperature $T_{drum-estimated}$ of the at least one brake drum (as the at least one component). If for example a measurement of the at least one temperature $T_{disc-measured}$ and $T_{drum-measured}$ using the at least one temperature sensor is difficult to perform or if the costs for the at least one temperature sensor are to be economized, then it is also possible to determine the at least one temperature $T_{disc-estimated}$ of the at least one brake disk and/or the at least one temperature $T_{drum-estimated}$ of the at least one brake drum at least as an estimated value. Subsequently, the maximum speed $v_{max}$ and/or the maximum acceleration $a_{max}$ may be established by taking into account at least the at least one estimated temperature $T_{disc-estimated}$ and $T_{drum-estimated}$. For this purpose, it is also possible to compare the at least one estimated temperature $T_{disc-estimated}$ and $T_{drum-estimated}$ to at least one temperature threshold value $T_{disc-estimated-threshold}$ and $T_{drum-estimated-threshold}$ in order to ascertain a possible existence of an increased risk of fading.

As an alternative or as a supplement to the temperatures $T_{disc-measured}$, $T_{disc-estimated}$, $T_{drum-measured}$ and $T_{drum-estimated}$ described in the two previous paragraphs, it is possible to detect an existence of an increased risk of fading also on the basis of the at least one driving variable that is relevant for overheating $n_{counted}$, $\Delta_{measured}$, $\Delta_{brake-measured}$ and $s_{measured}$. For this purpose, it may be taken into account that a fading frequently occurs either due to repeated intense braking of the vehicle or due to a continuous braking of the vehicle, e.g. during a downhill run. In the specific embodiment of the method for autonomous speed control shown in FIG. 1, the maximum speed $v_{max}$ and/or the maximum acceleration $a_{max}$ are established by investigating, by way of example, a counted total number $n_{counted}$ of braking actions over an already traveled distance of the autonomous or partly autonomous drive, an ascertained average braking duration value $\Delta_{brake-measured}$ of braking actions over the already traveled distance, an ascertained average time interval value $\Delta_{measured}$ between successive braking actions over the already traveled distance and an ascertained drop in the roadway elevation $s_{measured}$ of a roadway currently traveled by the vehicle. In particular, the variables $\Delta_{measured}$, $\Delta_{brake-measured}$ and $s_{measured}$ and a first product $P_1 = n_{counted} * \Delta_{brake-measured}$ and a second product $P_2 = n_{counted} * \Delta_{measured} * \Delta_{brake-measured}$ are compared to respectively one threshold value $\Delta_{measured\text{-}threshold}$, $\Delta_{brake\text{-}measured\text{-}threshold}$, $s_{measured\text{-}threshold}$, $P_{1\text{-}threshold}$ and $P_{2\text{-}threshold}$ in order to ascertain a possible existence of an increased risk of fading.

Optionally, it is also possible to establish the maximum speed $v_{max}$ and/or the maximum acceleration $a_{max}$ by taking into account at least one current speed value of the actual speed $v_{vehicle}$, an ascertained average speed value of the actual speed $v_{vehicle}$ over the already traveled distance of the autonomous or partly autonomous drive, an ascertained frequency of the actual speed $v_{vehicle}$ exceeding a specified speed threshold value over the already traveled distance, a current acceleration value of the actual acceleration $a_{vehicle}$, an ascertained average acceleration value of the actual acceleration $a_{vehicle}$ over the already traveled distance, an ascertained frequency of the actual acceleration $a_{vehicle}$ exceeding a specified acceleration threshold value over the already traveled distance, an ascertained average deceleration value of braking actions over the already traveled distance, an ascertained frequency of exceeding a specified deceleration threshold value when performing braking actions over the already traveled distance, an ascertained average value of roadway elevation drops over the already traveled distance and/or an ascertained frequency of exceeding a specified roadway elevation drop threshold value over the already traveled distance. The variables listed here may all be determined reliably and with a relatively low work effort during the autonomous or partly autonomous drive.

When establishing the maximum speed $v_{max}$ and/or the maximum acceleration $a_{max}$, it is also possible to take into account predicted values for the at least one driving variable relevant for overheating $n_{counted}$, $\Delta_{measured}$, $\Delta_{brake\text{-}measured}$ and $s_{measured}$ during the continuation of the autonomous or partly autonomous drive. It is also possible, for example, to establish the maximum speed $v_{max}$ and/or the maximum acceleration $a_{max}$ by taking into account at least one predicted average speed value of the actual speed $v_{vehicle}$ over a distance to be traveled in the autonomous or partly autonomous drive, a predicted frequency of the actual speed $v_{vehicle}$ exceeding the specified speed threshold value over the distance to be traveled, a predicted average acceleration value of the actual acceleration $a_{vehicle}$ over the distance to be traveled, a predicted frequency of the actual acceleration $a_{vehicle}$ exceeding the specified acceleration threshold value over the distance to be traveled, a predicted total number of braking actions over the distance to be traveled, a predicted average braking duration value of braking actions over the distance to be traveled, a predicted average time interval value between successive braking actions over the distance to be traveled, a predicted average deceleration value of braking actions over the distance to be traveled, a predicted frequency of exceeding the specified deceleration threshold value in braking actions over the distance to be traveled, a predicted average value of roadway elevation drops over the distance to be traveled and/or a predicted frequency of exceeding the specified roadway elevation drop threshold value over the distance to be traveled. Reliable values for the at least one driving variable relevant for overheating $n_{counted}$, $\Delta_{measured}$, $\Delta_{brake\text{-}measured}$ and $s_{measured}$ may be predicted with relatively little work effort on the basis of a position of the vehicle determined using the position-determining system, a road information provided by the navigation information system and a trajectory of the autonomous or partly autonomous drive that is known or auto-established for the continued travel of the vehicle.

In supplementary fashion, it is possible additionally to take into account in method step S0 that a risk of fading is normally reduced if at least one electric motor of the vehicle that is usable as a generator for braking the vehicle is ready for use. The at least one electric motor of the vehicle may be used in this case for supporting the at least one wheel brake caliper (and for the additional conversion of kinetic energy of the vehicle into electric energy) and may in this manner counteract an overheating of the at least one wheel brake caliper. If the at least one electric motor of the vehicle that is usable as a generator is ready for use, the existence of an increased risk of fading may be denied, otherwise affirmed. The at least one electric motor of the vehicle may be understood in particular as at least one electric motor of an electric drive train of the vehicle. If the at least one electric motor of the vehicle that is usable as a generator is ready for use, then the maximum sped $v_{max}$ and/or the maximum acceleration $a_{max}$ may assume greater values without risk of fading. Otherwise, a reduction of the maximum speed $v_{max}$ and/or of the maximum acceleration $a_{max}$ is often advantageous.

Figure 2:
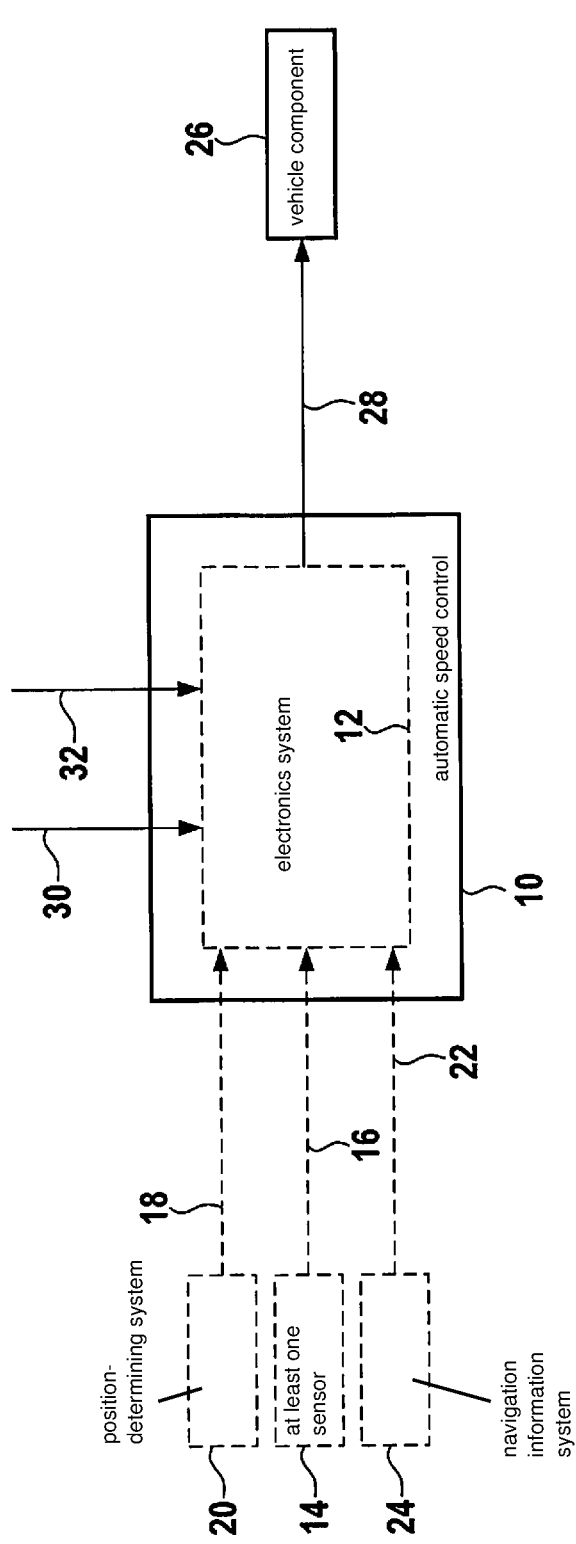
FIG. 2 shows a schematic representation of a specific embodiment of the automatic speed control for a vehicle.

FIG. 2 shows a schematic representation of a specific embodiment of the automatic speed control for a vehicle.

The automatic speed control 10 shown schematically in FIG. 2 may be used in a multitude of different vehicle types/motor vehicle types. It is pointed out explicitly that a usability of the automatic speed control 10 is not limited to any specific vehicle type/motor vehicle type of a vehicle/motor vehicle used. The automatic speed control 10 has an electronics system 12, which is designed to establish, during an autonomous or partly autonomous drive of the vehicle, repeatedly and autonomously at least one setpoint variable regarding a setpoint speed $v_0$ of the vehicle and/or a setpoint acceleration $a_0$ of the vehicle in such a way that the setpoint speed $v_0$ of the vehicle remains smaller than or equal to a specified or established maximum speed $v_{max}$ and/or the setpoint acceleration $a_0$ of the vehicle remains smaller than or equal to a specified or established maximum acceleration $a_{max}$. The autonomous establishment of the at least one setpoint variable occurs preferably by taking into account at least one item of traffic and/or driving environment information 16 ascertained by at least one sensor 14. In the autonomous establishment of the at least one setpoint variable it is likewise possible also to take into account data 18 of a position-determining system 20, such as e.g. a global positioning system, and/or data 22 of a navigation information system 24.

Electronics system 12 is additionally designed to control at least one vehicle component 26 of the vehicle by way of at least one control signal 28 by taking into account the at least one autonomously newly established setpoint variable in such a way that an actual speed $v_{vehicle}$ of the vehicle corresponds to the setpoint speed $v_0$ and/or an actual acceleration $a_{vehicle}$ of the vehicle corresponds to the setpoint acceleration $a_0$. The at least one vehicle component 26 may be for example an acceleration motor, an electromechanical brake booster, an ESP system and/or a plunger device (integrated power brake).

Electronics system 12 is furthermore designed to establish the maximum speed $v_{max}$ and/or the maximum acceleration $a_{max}$ by taking into account at least one measured and/or estimated temperature 30 of at least one component of at least one wheel brake caliper of the vehicle and/or at least one driving variable 32 relevant for an overheating of the at least one component of the at least one wheel brake caliper of the vehicle. Electronics system 12 may be designed in particular for evaluating all above-mentioned variables as the at least one temperature 30 and/or the at least one driving variable 32 relevant for overheating. Likewise, electronics system 12 may be able to implement all method steps described above. A repeated description of these method steps will therefore be omitted here.

If during its autonomous or partly autonomous drive, the vehicle equipped with automatic speed control 10 for example follows a preceding and continually braking and accelerating other vehicle, the advantageous design of automatic speed control 10 prevents the host vehicle from "mimicking"/adopting the driving style of the other vehicle which has a high risk of fading. There is thus no risk of fading in the host vehicle due to the advantageous design of automatic speed control 10.

What is claimed is:

1. An automatic speed control for a vehicle, comprising:
   an electronics system which is configured to autonomously establish, during an autonomous or partly autonomous drive of the vehicle, at least one setpoint variable regarding a setpoint speed of the vehicle and/or a setpoint acceleration of the vehicle, in such a way that the setpoint speed of the vehicle remains smaller than or equal to a specified maximum speed and/or that the setpoint acceleration of the vehicle remains smaller than or equal to a specified maximum acceleration, and to control at least one vehicle component of the vehicle by taking into account the at least one autonomously established setpoint variable in such a way that an actual speed of the vehicle corresponds to the setpoint speed and/or that an actual acceleration of the vehicle corresponds to the setpoint acceleration;
   wherein the electronics system is additionally configured to establish the maximum speed and/or the maximum acceleration by taking into account at least one measured and/or estimated temperature of at least one component of at least one wheel brake caliper of the vehicle and/or at least one driving variable that is relevant for overheating of the at least one component of the at least one wheel brake caliper of the vehicle.

2. The automatic speed control as recited in claim 1, wherein the electronics system is configured to estimate, on the basis of at least one temperature model, at least one temperature of at least one brake disk and/or at least one brake drum as the at least one component, and to establish the maximum speed and/or the maximum acceleration by taking into account at least the at least one estimated temperature.

3. The automatic speed control as recited in claim 1, wherein the electronics system is configured to establish the maximum speed and/or the maximum acceleration by taking into account at least one measured temperature, provided to the electronics system, of the at least one brake disk and/or of the at least one brake drum as the at least one component.

4. The automatic speed control as recited in claim 1, wherein the electronics system is configured to establish the maximum speed and/or the maximum acceleration by taking into account: at least one current speed value of the actual speed, and/or an ascertained average speed value of the actual speed over an already traveled distance of the autonomous or partly autonomous drive, and/or an ascertained frequency of the actual speed exceeding a specified speed threshold value over the already traveled distance, and/or a current acceleration value of the actual acceleration, and/or an ascertained average acceleration value of the actual acceleration over the already traveled distance, and/or an ascertained frequency of the actual acceleration exceeding a specified acceleration threshold value over the already traveled distance, a counted total number of braking actions over the already traveled distance, and/or an ascertained average braking duration value of braking actions over the already traveled distance, and/or an ascertained average time interval value between consecutive braking actions over the already traveled distance, and/or an ascertained average deceleration value of braking actions over the already traveled distance, and/or an ascertained frequency of exceeding a specified deceleration threshold value when performing braking actions over the already traveled distance, and/or an ascertained roadway elevation drop of a roadway currently traveled by the vehicle, and/or an ascertained average value of roadway elevation drops over the already traveled distance and/or an ascertained frequency of exceeding a specified roadway elevation drop threshold value over the already traveled distance as the at least one driving variable relevant for overheating.

5. The automatic speed control as recited in claim 1, wherein the electronics system is configured to establish the maximum speed and/or the maximum acceleration by taking into account: at least one predicted average speed value of the actual speed over a distance to be traveled in the autonomous or partly autonomous drive, and/or a predicted frequency of the actual speed exceeding the specified speed threshold value over the distance to be traveled, and/or a predicted average acceleration value of the actual acceleration over the distance to be traveled, and/or a predicted frequency of the actual acceleration exceeding the specified acceleration threshold value over the distance to be traveled, a predicted total number of braking actions over the distance to be traveled, and/or a predicted average braking duration value of braking actions over the distance to be traveled, and/or a predicted average time interval value between successive braking actions over the distance to be traveled, and/or a predicted average deceleration value of braking actions over the distance to be traveled, and/or a predicted frequency of exceeding the specified deceleration threshold value in braking actions over the distance to be traveled, and/or a predicted average value of a roadway elevation drops over the distance to be traveled, and/or a predicted frequency of exceeding the specified roadway elevation drop threshold value over the distance to be traveled as the at least one driving variable relevant for overheating.

6. A method for the autonomous speed control of a vehicle, comprising:
   autonomously establishing at least one setpoint variable regarding a setpoint speed of the vehicle and/or a setpoint acceleration of the vehicle, during an autonomous or partly autonomous drive of the vehicle in such a way that the setpoint speed of the vehicle remains smaller than or equal to a specified maximum speed and/or the setpoint acceleration of the vehicle remains smaller than or equal to a specified maximum acceleration;
   controlling at least one vehicle component of the vehicle by taking into account the at least one autonomously established setpoint variable in such a way that an actual speed of the vehicle corresponds to the setpoint speed and/or an actual acceleration of the vehicle corresponds to the setpoint acceleration; and
   establishing the maximum speed and/or the maximum acceleration by taking into account at least one measured and/or estimated temperature of at least one component of at least one wheel brake caliper of the vehicle and/or at least one driving variable that is relevant for overheating of the at least one component of the at least one wheel brake caliper of the vehicle.

7. The method as recited in claim 6, wherein on the basis of at least one temperature model, at least one temperature of at least one brake disk and/or of at least one brake drum is estimated as the at least one component, and the maximum speed and/or the maximum acceleration are established by taking into account at least the at least one estimated temperature.

8. The method as recited in claim 6, wherein the maximum speed and/or the maximum acceleration are established by taking into account at least one measured temperature of the at least one brake disk and/or of the at least one brake drum as the at least one component.

9. The method as recited in claim 6, wherein the maximum speed and/or the maximum acceleration are established by taking into account: at least one current speed value of the actual speed, and/or an ascertained average speed value of the actual speed over an already traveled distance of the autonomous or partly autonomous drive, and/or an ascertained frequency of the actual speed exceeding a specified speed threshold value over the already traveled distance, and/or a current acceleration value of the actual acceleration, and/or an ascertained average acceleration value of the actual acceleration over the already traveled distance, and/or an ascertained frequency of the actual acceleration exceeding a specified acceleration threshold value over the already traveled distance, and/or a counted total number of braking actions over the already traveled distance, and/or an ascertained average braking duration value of braking actions over the already traveled distance, and/or an ascertained average time interval value between consecutive braking actions over the already traveled distance, and/or an ascertained average deceleration value of braking actions over the already traveled distance, and/or an ascertained frequency of exceeding a specified deceleration threshold value when performing braking actions over the already traveled distance, and/or an ascertained roadway elevation drop of a roadway currently traveled by the vehicle, and/or an ascertained average value of roadway elevation drops over the already traveled distance, and/or an ascertained frequency of exceeding a specified roadway elevation drop threshold value over the already traveled distance as the at least one driving variable relevant for overheating.

10. The method as recited in claim 6, wherein the maximum speed and/or the maximum acceleration are established by taking into account: at least one predicted average speed value of the actual speed over a distance to be traveled in the autonomous or partly autonomous drive, and/or a predicted frequency of the actual speed exceeding the specified speed threshold value over the distance to be traveled, and/or a predicted average acceleration value of the actual acceleration over the distance to be traveled, and/or a predicted frequency of the actual acceleration exceeding the specified acceleration threshold value over the distance to be traveled, a predicted total number of braking actions over the distance to be traveled, and/or a predicted average braking duration value of braking actions over the distance to be traveled, and/or a predicted average time interval value between successive braking actions over the distance to be traveled, and/or a predicted average deceleration value of braking actions over the distance to be traveled, and/or a predicted frequency of exceeding the specified deceleration threshold value in braking actions over the distance to be traveled, and/or a predicted average value of roadway elevation drops over the distance to be traveled, and/or a predicted frequency of exceeding the specified roadway elevation drop threshold value over the distance to be traveled as the at least one driving variable relevant for overheating.

* * * * *